United States Patent [19]

Benjay et al.

[11] Patent Number: 5,431,199
[45] Date of Patent: Jul. 11, 1995

[54] REDUNDANT SEAL FOR VEHICLE FILLER NECK

[76] Inventors: Robert P. Benjay, 7535 Walsh Rd., Dexter, Mich. 48130; Ed Dornan, 375 Carriage Way, Ypsilanti, Mich. 48197; Jay E. Hartford, 117 E. Huron River Dr., Belleville, Mich. 48111

[21] Appl. No.: 159,423

[22] Filed: Nov. 30, 1993

[51] Int. Cl.⁶ .............................. B65B 31/06
[52] U.S. Cl. ...................... 141/59; 137/588; 144/46; 220/86.2
[58] Field of Search ................... 141/44–46, 141/59, 312; 137/587–589; 220/86.2; 55/88, 387

[56] References Cited

U.S. PATENT DOCUMENTS

| | | |
|---|---|---|
| 4,337,873 | 7/1982 | Johnson . |
| 4,770,677 | 9/1988 | Harris . |
| 4,816,045 | 3/1989 | Szlaga et al. . |
| 4,826,511 | 5/1989 | Harris ........................ 55/ |
| 4,881,578 | 11/1989 | Rich et al. ............... 141/44 |
| 4,917,157 | 4/1990 | Gifford et al. ........... 141/59 |
| 4,924,923 | 5/1990 | Boehmer et al. ......... 141/312 |
| 4,932,444 | 6/1990 | Micek ....................... 141/59 |
| 4,946,060 | 8/1990 | Sherwood et al. ...... 220/86.2 |
| 4,966,299 | 10/1990 | Teets et al. ............ 220/86.2 X |
| 5,022,433 | 6/1991 | Jansky et al. ............ 137/588 |
| 5,027,868 | 7/1991 | Morris et al. ............ 141/59 |
| 5,056,570 | 10/1991 | Harris et al. ............. 141/59 |
| 5,186,220 | 2/1993 | Scharrer .................... 141/59 |
| 5,195,566 | 3/1993 | Ott et al. ................ 141/312 |
| 5,234,122 | 8/1993 | Cherng ................... 220/86.2 |
| 5,271,438 | 12/1993 | Griffin et al. ............. 141/59 |

Primary Examiner—Ernest G. Cusick

[57] ABSTRACT

A vaportight seal door assembly mounted in the upper end of a vehicle fuel system filler pipe. The seal door is normally biased to a closed position to create a vaportight seal between the fuel tank and the filler pipe inlet, normally closed by a cap. The seal door yields upon insertion of a dispenser nozzle to permit refueling. The seal door is provided with pressure relief structure to vent fuel vapor from the fuel tank to the upper end of the filler pipe at a predetermined pressure differential when the seal door is closed.

16 Claims, 5 Drawing Sheets

REDUNDANT SEAL FOR VEHICLE FILLER NECK

FIELD OF THE INVENTION

The present invention is related to seal door structures for use in the fuel tank filler pipes of automotive vehicles, and more particularly to a vaportight seal door assembly which opens in response to the insertion of a fuel dispenser nozzle.

BACKGROUND OF THE INVENTION

Vehicular fuel tank filler pipes are currently provided at their upper end with a seal door structure through which the fuel dispenser nozzle must be inserted to introduce fuel into the fuel tank. A known seal door structure comprises a partition having an opening of a diameter sized to admit the fuel dispenser nozzle, and a closure in the form of a flap which is normally spring-biased to close the opening in the partition, but which is displaced to the open position by the insertion of the dispenser nozzle.

It is desirable to use a vaportight seal door in the filler pipe to prevent the venting of fuel vapor to the upper end of the filler pipe and subsequently to the atmosphere when the cap is removed.

It is also known to equip vehicular fuel systems with pressure relief means to relieve excess tank pressure by venting it to the atmosphere. Such pressure relief structure can be mounted in the filler pipe cap, as disclosed for example in U.S. Pat. No. 4,457,325. Pressure relief is sometimes made redundant as shown in U.S. Pat. No. 4,816,045, in which a bypass safety valve vents excess fuel tank pressure around a seal door to the inlet region of the filler pipe, and a cap-mounted relief valve provides additional venting if the pressure relief provided by the bypass safety valve is not sufficient.

A disadvantage with such redundant pressure relief structure is that it requires complicated, space-consuming bypass structure in the filler neck in addition to the seal door itself. Moreover, the seal door of U.S. Pat. No. 4,816,045 requires a bleed orifice and therefore is not vaportight.

Pressure relief filler pipe caps accordingly cannot function where a vaportight seal door closes off the filler pipe; i.e., they are made superfluous by the non-venting seal door. Despite any advantages, then, of the cap-mounted pressure relief concept as primary or secondary tank pressure relief, the prior art has not adequately addressed the need for a simple, compact vaportight seal door assembly with which such caps can be used.

Another disadvantage of prior art vaportight seal doors is that the soft seal material mounted on the door itself or on the partition on which the door seats is often subject to contact with the fuel dispenser nozzle when the nozzle is inserted. This contact abrades or wears the seal material and results in a short seal life.

SUMMARY OF THE INVENTION

The present invention is accordingly directed to a vaportight seal door structure which eliminates the above-described drawbacks of the prior art. Namely, the seal door structure of the present invention is vaportight, yet does not interfere with the function of cap-mounted pressure relief structure. It also protects the seal door seal from undue abrasion and wear by the fuel dispenser nozzle.

In its most basic form the invention comprises a vaportight seal door having internal pressure relief means to provide at least a first stage of pressure relief venting for the fuel tank. If the filler pipe cap does not provide an effective seal or is misplaced, the seal door of the present invention will vent excess vapor pressure from the fuel tank to the atmosphere at pressures lower than with a filler cap, yet at a level above normal tank pressure. In a preferred embodiment the seal door of the present invention is used in combination with a venting filler pipe cap to provide additive stages of pressure relief in the filler pipe, raising the pressure relief level in a desirable manner. In either case (with or without a cap) the seal door of the present invention reduces or eliminates the venting of raw fuel vapor directly to the atmosphere from the filler pipe, while still providing pressure relief.

The inventive seal door also provides vacuum relief for the fuel tank.

The seal door of the present invention additionally will function with standard or "stage II" (pump-side vapor recovery) fuel dispenser nozzles.

In one preferred embodiment of the invention, a vaportight seal door is mounted on the lower surface of a filler pipe partition having an aperture through which the dispenser nozzle is inserted. The seal door is biased to a closed position in which it seals the partition aperture in a vaportight manner. Seal structure for this purpose is mounted on the partition, protected from the dispenser nozzle. When the dispenser nozzle is pushed through the aperture and against the seal door, the hinged seal door yields to permit insertion of the dispenser nozzle into the lower portion of the filler pipe.

The seal door itself contains internal pressure relief means providing a pressure differential between the fuel tank and the upper end of the filler pipe. In one embodiment the pressure relief means is in the form of a valve mounted within a hollow body portion of the seal door. The hollow body of the seal door includes a vapor inlet communicating with the lower end of the filler pipe below the partition, and a vapor outlet communicating with the upper end of the filler pipe above the partition. The internal pressure relief valve is movable between open and closed positions alternately opening and closing vapor communication between the fuel tank and the upper end of the fill pipe through the seal door. The closing bias force on the internal pressure relief valve is set to yield at a predetermined differential pressure.

In another embodiment the seal door of the present invention includes separate, offset nozzle-contact and external sealing surfaces to prevent dispenser nozzle-induced wear on the seal between door and partition. In a specific embodiment the hollow, valve-containing portion of the seal door defines a nozzle-contact surface centered within the dispenser nozzle aperture, while a radial flange extends from the hollow body to sealingly engage and close the dispenser nozzle aperture.

In yet a further embodiment of the invention, the seal door itself is of two-piece construction, comprising an upper portion and a lower portion which, when connected, define the hollow, valve-containing body portion of the seal and the radially-extending flange portion. The upper portion of the seal door is contacted by the dispenser nozzle as it is inserted through the nozzle aperture. To prevent stress loading of the mechanical connection between the upper and lower portions of the seal door assembly, the seal door is hinged on an extension of only the upper portion of the seal door. This is accomplished with a radial hinge extension from the upper portion of the seal door.

In a preferred form the nozzle-contacting surface of the upper portion of the seal door assembly is convex to provide a contact pad for the nozzle which is resistant to impact damage from the nozzle.

These and other advantages of the present invention will become apparent upon further reading of the specification.

DETAILED DESCRIPTION OF THE DRAWINGS

Figure 1:
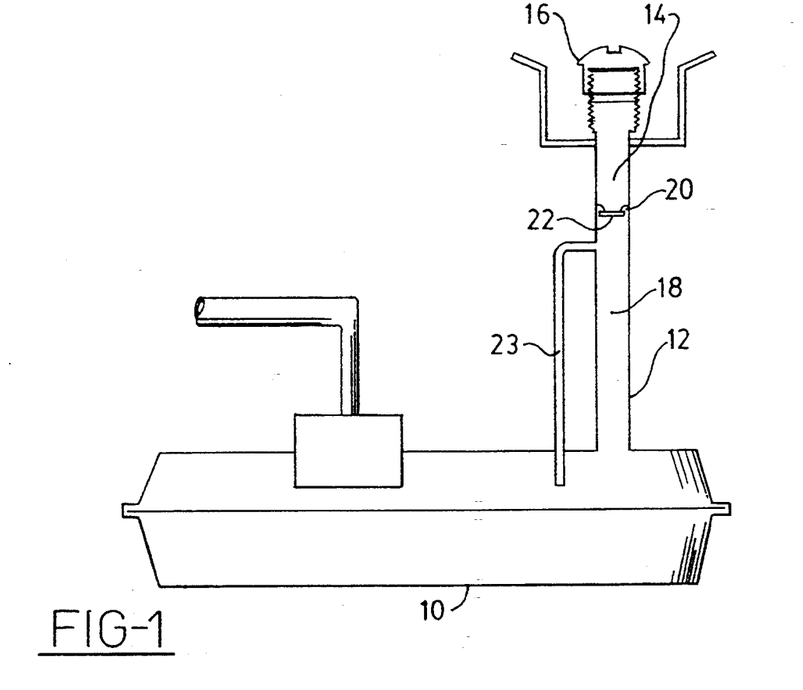
FIG. 1 is a schematic view of a vehicle fuel system incorporating the seal door structure of the present invention.

Referring now to FIG. 1, a vehicle fuel system is shown comprising a fuel tank 10, a filler pipe 12 having an upper portion or inlet 14 closed by cap 16, and a lower portion 18 separated from upper portion 14 by a vaportight partition 20 and seal door assembly 22. In the embodiment of FIG. 1, filler pipe cap 16 is a pressure relief venting cap of a known type.

A vapor make-up vent line 23 extends from the interior of the fuel tank to a point adjacent partition 20 in lower portion 18 of the filler pipe. Vent line 23 operates in well-known fashion to activate the automatic shutoff in a fuel dispenser nozzle inserted through partition 20.

The seal door assembly 22 in FIG. 1 is vaportight and in a closed position seals the fuel tank from the upper portion 14 of the filler pipe and cap 16. However, according to the present invention, seal door assembly 22 contains pressure relief means which vent the tank to the upper portion 14 of the filler pipe in response to a predetermined excess vapor pressure differential across partition 20.

Figure 2:
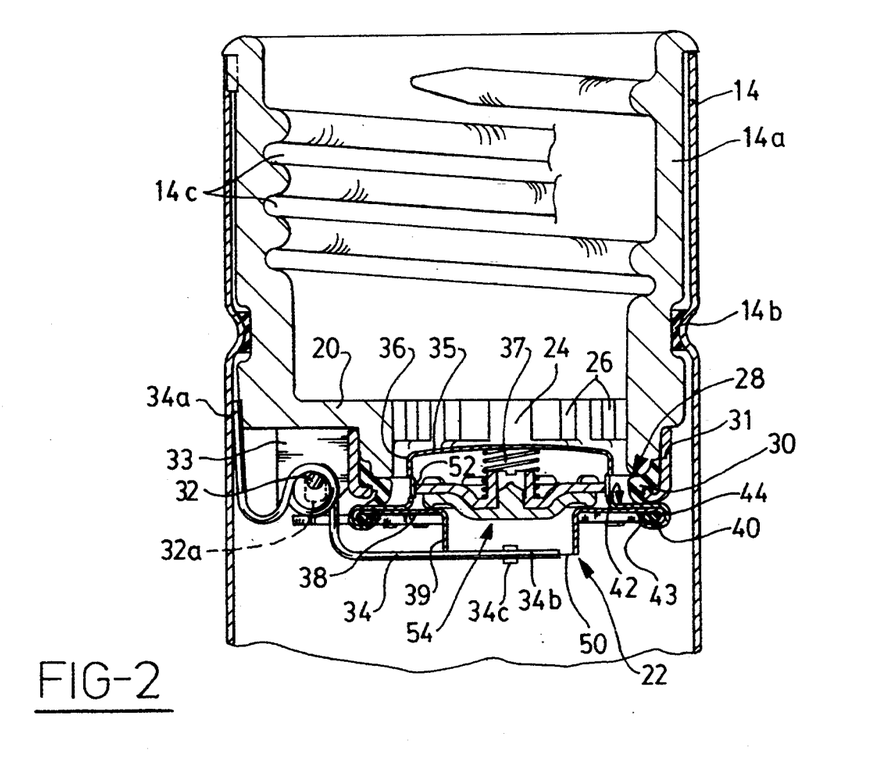
FIG. 2 is a side section view of the seal door structure of the present invention mounted in the upper end of a filler pipe, in a closed, non-venting position.

Referring now to FIG. 2, seal door assembly 22 is shown in greater detail as being pivotally mounted on the lower surface of a filler pipe partition 20 to open and close a fill nozzle aperture 24 in partition 20 in the manner of a trap door.

Fill nozzle aperture 24 is sized to permit insertion of a standard automotive gasoline or other fuel dispenser nozzle (FIG. 5) to introduce fuel into fuel tank 10. A plurality of radial ribs 26 projects inwardly from the periphery of nozzle aperture 24 to center the dispenser nozzle with respect to aperture 24.

Partition 20 in the illustrative embodiment is part of a cup-like insert 14a which fits axially into the filler pipe inlet 14, sealed at 14b with an annular seal and filler pipe crimp, and provided with threads 14c for mating with a threaded filler pipe cap (not shown). As illustrated in FIG. 2, insert 14a is a molded plastic insert which simultaneously defines partition 20 and carries the inventive seal door structure. Partition 20 includes a seal door seat 28 extending downwardly toward the fuel tank and supporting an annular, fuel-resistant seal element 30 crimped or otherwise fastened thereto as shown at 31. Seal element 30 is relatively soft and deformable to provide a vaportight seal between seal door 22 and seat 28.

Figure 3:
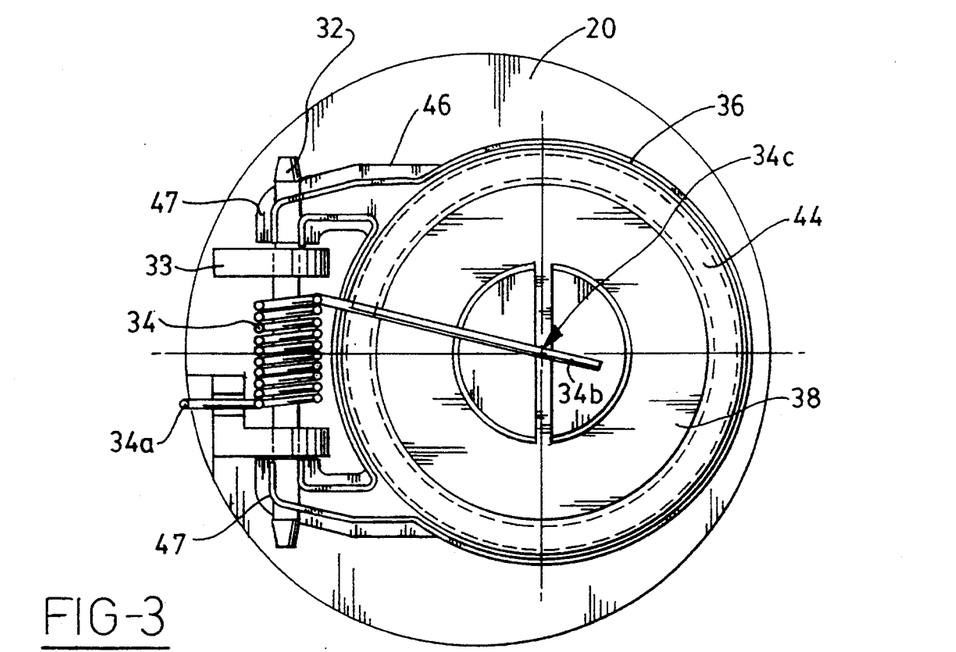
FIG. 3 is a plan view of the seal door structure of FIG. 2.

Referring to FIGS. 2 and 3, seal door 22 is pivotally or hingedly mounted about a pivot pin 32. Pivot pin 32 is held in place on bushings 33 formed integrally with insert 14a, radially offset from aperture 24. A coil spring 34 is held coaxially by a pivot pin 32 between bushings 33, the spring held or fastened at one end 34a between the filler pipe wall and insert 14a. Free end 34b is connected to a cross-bar 34c on door 22, positioned relative to the door such that the spring closing force is applied to the center of the door.

Spring 34 normally biases trap door 22 to the closed position against seal 30 as shown in FIG. 2. The spring closing force on door 22 is applied at 34c, which is centered relative to aperture 24 and seal 30 to apply even sealing force about the periphery of door 22. Insertion of the dispenser nozzle through aperture 24 and against seal door 22 pivots the seal door about pivot pin 32, simultaneously applying torque to spring 34. When the dispenser nozzle is removed, spring 34 via end 34b forces trap door assembly 22 back to the closed position shown in FIG. 2.

Spring 34 additionally forms a static ground path from door 22 to lower portion 18 of the filler pipe.

Still referring to FIG. 2, seal door assembly 22 in the illustrated embodiment comprises an upper portion 36 and a lower portion 38 manufactured separately and subsequently assembled, for example by crimping or other suitable mechanical connection at 40. When assembled, upper portion 36 and lower portion 38 define a hollow body portion 37 and a radially extending flange 42. Hollow body portion 37 is centered within and extends upwardly into nozzle aperture 24 to a point below ribs 26. The diameter of hollow body portion 37 is slightly less than that of aperture 24, seat 28 and annular seal 30 for a purpose hereinafter described. Flange 42 is of a diameter greater than aperture 24, seat 28 and seal 30 so that its upper surface comes into contact with seal 30 in the closed position of FIG. 2.

To ensure a vaportight connection between upper portion 36 and lower portion 38 of seal door 22, lower portion 38 is provided on its outboard edge with a small annular pocket or channel 43, surrounded by crimp 40 and containing an O-ring seal 44. 0-ring seal 44 provides a vaportight seal between upper portion 36 and lower portion 38 when assembled as shown in FIG. 2.

It can be seen in FIGS. 2 and 3 that upper portion 36 of seal door 20 is of slightly greater diameter than lower portion 38, and further includes a hinge extension 46 comprising two ears 47 mounted to rotate about pivot pin 32 via oversize, elongated slots 32a. The loading forces exerted by the dispenser nozzle on the seal door assembly as it is opened are transmitted through upper portion 36 and borne by hinge extension 46. The sealing connection at 40 between upper portion 36 and lower portion 38 is accordingly isolated from loading forces during dispenser nozzle insertion. This prevents fracture or failure of the seal door assembly 22 at crimp 40 over its expected lifespan of thousands of refuelings.

Elongated slots 32a in hinge extension 46 give seal door 22 some vertical or linear play relative to pivot pin 32. This allows seal door 22 to "float" as well as pivot when opened or closed, helping align flange 42 with seal 30 and improving its seal with aperture 24. Slots 32a are shown in broken lines in FIGS. 2-6, and are more clearly shown in FIG. 7.

Seal door assembly 22 further includes an axial vent inlet 50 defined by annular flange portion 39 of lower portion 38. Axial vent inlet 50 communicates with the interior of hollow body 37. Upper portion 36 of seal door 22 includes a plurality of radial vent outlets 52 venting the interior of hollow body 37 to the upper end 14 of the filler pipe. Axial vent 50, the interior of hollow body 37, and radial vents 52 accordingly define a vapor flow path which bypasses partition 20.

Figure 4:
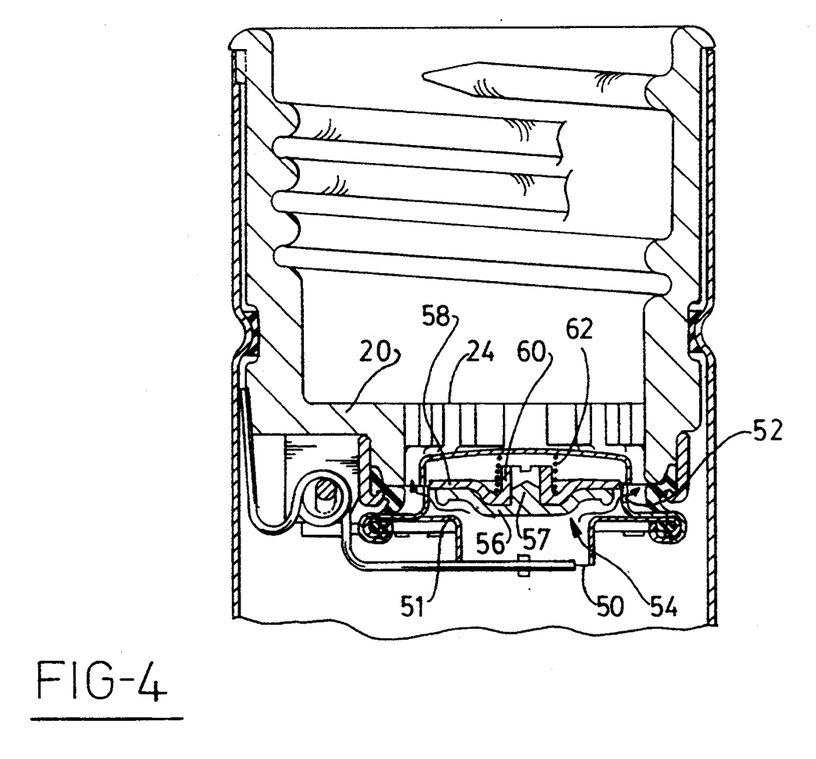
FIG. 4 is a view of the seal door structure of FIG. 2 in a closed, venting condition.

The two-piece construction of seal door 22, and the resulting hollow seal door body 37, permits the mounting of a valve assembly 54 in seal door 22. Referring to FIG. 4, valve assembly 54 comprises a deformable, circular seal portion 56 connected by a central prong 57 to valve plate 58. Valve plate 58 includes a central stem portion 60 carrying a bias spring 62, spring 62 supported at its other end to the inside surface of upper portion 36. Spring 62 normally pushes valve 54 to a closed position against seat portion 51 of axial vent inlet 50, closing the vapor flow path from the fuel tank through the seal door to the upper end 14 of the filler pipe. The strength of spring 62 is selected to yield to a predetermined vapor pressure differential between the fuel tank and upper end 14 of the filler pipe, which forces valve 50 upwardly off seat 51 to open a vapor flow path through axial vent inlet 50, the interior of hollow seal door body 37, and radial vent outlets 52' to the upper end 14 of the filler pipe.

Under extreme fuel tank conditions, the threshold valve-opening pressure differential is reached, and valve assembly 54 opens to vent vapor from 18 to 14 until the differential is lowered, causing valve 54 to close again. The vapor so vented is trapped by cap 16. If the vapor 10 pressure at 18 is not reduced by the pressure relief vapor venting through valve 54 (as can occur in fuel tank applications as hot fuel evaporates), upper end 14 of the filler pipe becomes pressurized until the valve-opening differential pressure of cap 16 is reached. Under these conditions the vapor is vented to atmosphere, allowing the fuel tank pressure to stabilize and ultimately decrease. As pressure decreases, the valve in cap 16 closes, followed by valve 54 in seal door 22, resealing the fuel tank for normal operation.

The provision of a pressure relief valve in the seal door itself greatly enhances the modularity of the drop-in insert 14a and the entire inventive assembly. It further permits adaptation of the assembly to virtually any filler pipe, without the need for special filler pipe structure or an increase in the diameter of the filler pipe.

Hollow body portion 37 of seal door 22 has a diameter less than dispenser nozzle aperture 24 and external seal 30 to provide a clear vapor flow path from radial vent outlets 52. The upper nozzle-contacting surface 35 of upper portion 36, however, is of a diameter significantly greater than the internal, nozzle-contacting diameter of ribs 26. This ensures complete and centered contact between the dispenser nozzle and nozzle-contacting surface 35 of seal door 22. In the illustrated embodiment nozzle-contacting surface 35 is convex to increase strength and resist distortion from dispenser nozzle insertion.

Another advantage of the seal door 22 according to the present invention is an inherent seal-protection function. The separation or offset between nozzle-contacting surface 35 and the seal-contacting flange 42 of the seal door 22, combined with the nozzle-centering ribs 26, ensures that the dispenser nozzle does not come into contact with seal 30 when it is inserted through aperture 24 past seal door 22. Contact between the metal dispenser nozzle mouth, which often is nicked and scratched, and the relatively soft material used in seal 30 would otherwise prematurely wear the seal 30, causing a deterioration in its sealing performance.

Figure 6:
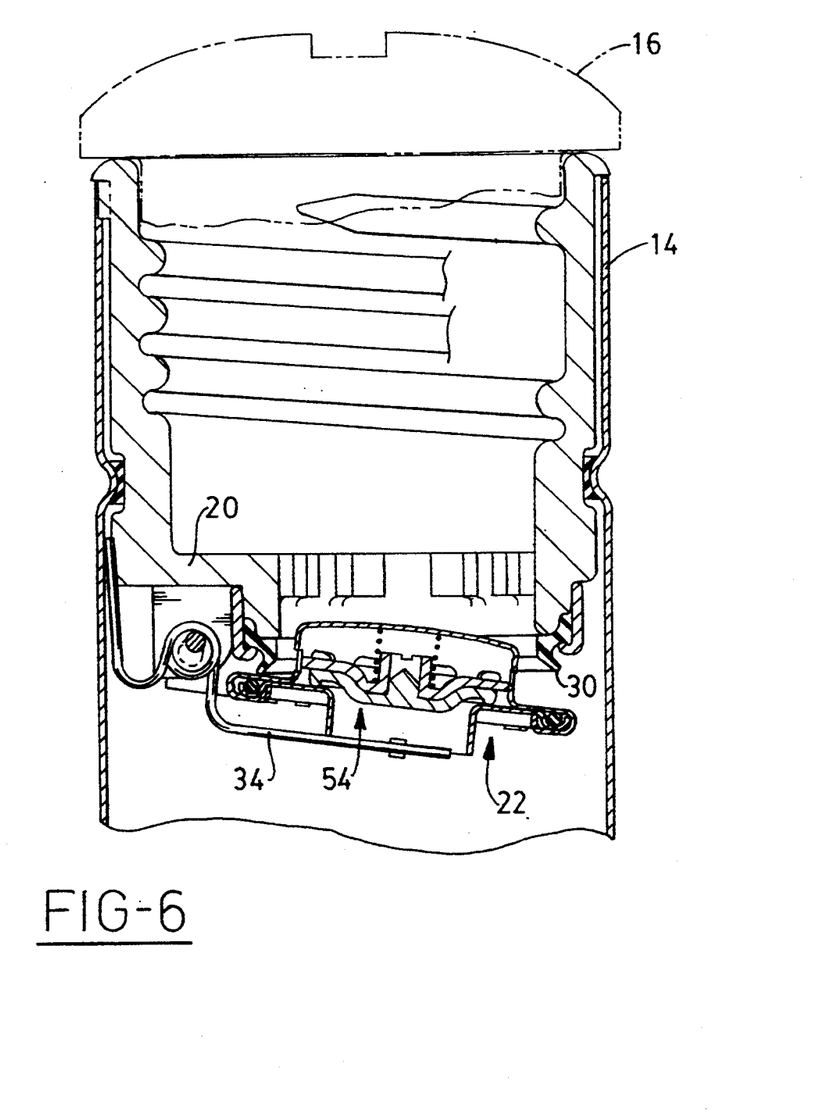
FIG. 6 is a view of the seal door in a vacuum relief mode.
Figure 7:
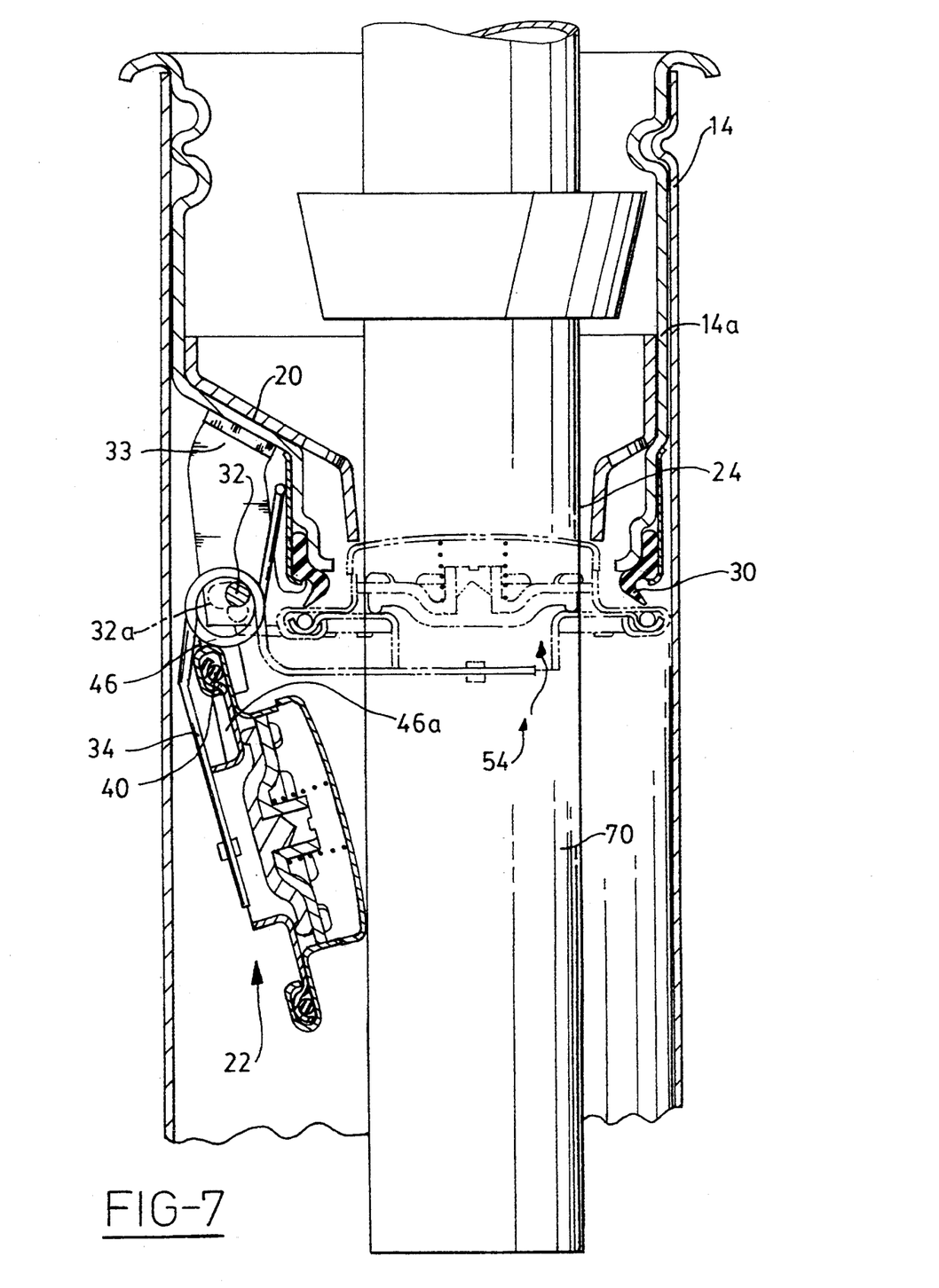
FIG. 7 is a side view of a seal door structure according to the present invention, showing in detail a slotted hinge structure common to all of the illustrated embodiments.

The seal door 22 of the present invention also provides vacuum relief for the fuel tank, the force of spring 34 balanced to permit the seal door to open in response to negative pressure in the fuel tank as shown in FIG. 6. At a minimum the air in the upper end 14 of the filler pipe is drawn into the fuel tank to relieve tank vacuum. The filler pipe cap itself can also provide additional vacuum relief in known fashion to increase the volume of air available for vacuum relief.

Operation

Normally, when the vehicle is not being refueled and the fuel tank is at normal operating pressures, seal door 22 of the present invention will be in the closed, non-venting position shown in FIG. 2. The seal formed between flange 42 and external seal 30, and between valve 54 and valve seat 51 on the interior of the seal door 22, completely seals the upper end 14 of filler pipe 12 from the interior of the fuel tank. Accordingly, when cap 16 is removed, there is no leakage or "puff loss" of fuel vapor to the atmosphere until the dispenser nozzle is inserted. If a "Stage II" (pump-side vapor recovery system) nozzle is used, minimal or no vapor is admitted to the atmosphere.

Figure 5:
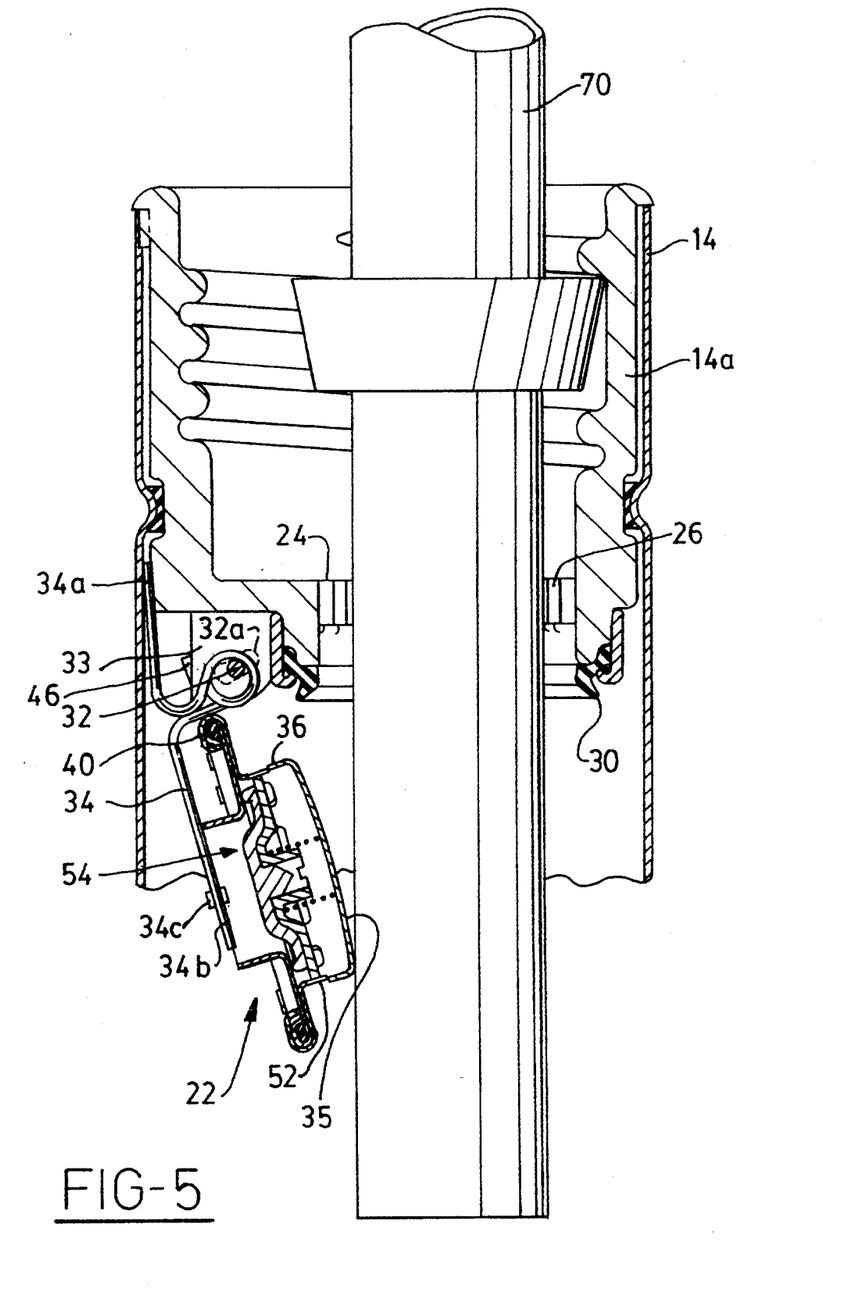
FIG. 5 is a view of the seal door of FIG. 2 being opened by a filler nozzle.

During refueling in FIG. 5, cap 16 is removed from the filler pipe, and a dispenser nozzle 70 is inserted through aperture 24, guided by ribs 26 into centered contact with the convex, nozzle-contacting surface 35 of seal door assembly 22. The insertion force of dispenser nozzle 70 pivots seal door 22 about pivot pin 32 against the force of coil spring 34. All loading force from the dispenser nozzle on the seal door assembly is taken up by the spring and the hinge extension 46 on the upper portion 36 of seal door assembly 22 integral with nozzle-contacting surface 35. In this manner the crimp connection 40 between the upper and lower portions 36,38 of the seal door assembly is not subjected to shear stress.

After refueling, the dispenser nozzle is removed and coil spring 34 forces seal door 22 back into its closed position against external seal 30.

If the vapor pressure differential between the fuel tank and upper end 14 of the filler pipe reaches a predetermined threshold, the tank vapor pressure acting on the lower surface of valve 54 through axial vent inlet 50 forces valve 54 up off valve seat 51 against the force of spring 62 and the pressure in the upper end of the fill pipe. This opens the pressure relief vapor flowpath defined by axial vent inlet 50, the interior of hollow body 37 and radial vents 52 as shown in FIG. 4. The upper end 14 of the filler pipe acts as an expansion or pressure relief chamber by absorbing its volume in fuel vapor, and further traps vapor to cause a pressure increase in chamber 14 with continued fuel tank pressure increase. The pressure in upper end 14 of the filler pipe is accordingly biased lower than the pressure in lower end 18 by an amount equal to the pressure differential required to open valve 54. If the pressure in chamber 14 exceeds the predetermined relief pressure threshold of a valve in the filler pipe cap 16, cap 16 provides emergency venting to the atmosphere. This is only likely to happen in extreme overpressure situations; it is undesirable to vent vapor to the atmosphere as a normal mode of operation.

For example, valve assembly 54 in seal door 22 could be set to provide pressure relief across partition 20 at tank pressures over 40″. Up to 40″ of tank pressure, valve 54 would remain closed and upper end 14 of the filler pipe would remain, for example, at atmospheric pressure. Above 40″ tank pressure, valve assembly 54 would open to provide pressure relief and maintain a pressure differential of 40″ across partition 20. At 42″ tank pressure, pressure in chamber 14 would be 2″; at 44″ tank pressure, pressure in chamber 14 would be 4″; and so on.

Where redundant pressure relief structure is provided in the filler pipe cap 16, the pressure differential maintained across partition 20 by valve assembly 54 will change once the pressure in chamber 14 reaches the threshold relief pressure for the cap-mounted relief valve. For example, where the pressure relief threshold of the cap-mounted relief valve is 10″, at 50″ tank pressure the pressure in chamber 14 would be 10″ and the pressure differential across partition 20 would be 40″.

It will be understood that the foregoing description is of an illustrative embodiment, and is not intended to be limiting, as many modifications and variations of the illustrative embodiment will fall within the scope of the appended claims. For example, in the embodiment of FIG. 7, cup-like insert 14a comprises a stamped metal insert. However, despite the structural differences between the embodiments of FIGS. 1-6 and FIG. 7, the operation of the FIG. 7 embodiment in providing pressure relief through seal door 22 is essentially the same.

We claim:

1. In a vehicle fuel system having a fuel tank and a filler pipe with an inlet, an improved seal door assembly in the filler pipe between the inlet and the fuel tank, comprising:

partition means in the filler pipe near the filler pipe inlet, the partition means including an aperture sized to permit insertion of a fuel dispenser nozzle through the partition means, the partition means further defining a seal door seat associated with the aperture;

a seal door movable from a closed position on the seat to an open position off the seat upon insertion of a dispenser nozzle through the aperture, the seal door biased by spring means to the closed position;

external seal means associated with the seal door and the seat, the external seal means forming a vaportight seal between the seal door and the seat in the seal door closed position;

wherein the seal door comprises a hollow body having an upper portion with a dispenser nozzle contact surface, a lower portion having a axial vent opening in vapor communication with the fuel tank, radial vent ports formed in the upper portion communicating the interior of the hollow seal door body to the upper end of the filler pipe, an internal valve seat between the axial vent opening and the radial vent ports, and internal pressure relief valve means axially movable on and off the valve seat, the valve means normally biased to a closed position on the valve seat.

2. Apparatus as defined in claim 1, wherein the seal door includes a radial flange of greater diameter than the hollow body portion, the radial flange engaging the external seal means on the seal door seat when the seal door is in the closed position.

3. Apparatus as defined in claim 2, wherein the hollow seal door body comprises separate upper and lower body portions connected to a point radially interior of the pivot point of the seal door assembly.

4. Apparatus as defined in claim 3, wherein the seal door assembly includes a radial hinge extension connected to the seal door at a point spaced from the connection of the upper and lower body portions, the radial extension forming a pivot hinge for the seal door assembly such that nozzle loading forces on the seal door assembly are transmitted to the hinge extension without loading the connection between the upper and lower body portions of the seal body assembly.

5. Apparatus as defined in claim 1, wherein the upper nozzle-contacting surface of the seal door assembly is of lesser diameter than the seal door seat.

6. Apparatus as defined in claim 5, wherein the upper nozzle-contacting surface of the upper portion of the seal door assembly is convex.

7. Apparatus as defined in claim 1, wherein the spring means has a first end connected to the seal door to bias it to the closed position, and a second end connected to the filler pipe to provide a static ground path for the seal door.

8. Apparatus as defined in claim 1, wherein the spring means acts on a central portion of the seal door to bias it to the closed position.

9. Apparatus as defined in claim 1, wherein the seal door includes a hinge extension rotatably connected to a transverse pivot pin spaced radially from the aperture, the hinge extension including elongated slots for both linear and rotational displacement of the seal door relative to the pivot pin during opening and closing.

10. Apparatus as defined in claim 1, wherein the partition means, seal door, and external seal means comprise a cup-like unitary insert inserted in the inlet end of the filler pipe.

11. In a vehicle fuel system having a fuel tank and a filler pipe with an inlet, an improved seal door assembly in the filler pipe between the inlet and the fuel tank, comprising:

vaportight seal door means in the filler pipe near the filler pipe inlet, dividing the filler pipe into a lower end communicating with the fuel tank, and an upper end selectively closed by a cap on the filler pipe inlet, the seal door means movable between an open position permitting insertion of a dispenser nozzle therethrough, and a closed position sealing in the upper end from the fuel tank, the seal door means comprising a hollow body portion having an upper nozzle contact surface, a vapor inlet, a vapor outlet, a valve seat between the vapor inlet and outlet, and internal pressure relief means movable on and off the valve seat for venting fuel vapor from the fuel tank to the upper end of the filler pipe through the hollow body portion at a predetermined differential pressure when the seal door is in the closed position.

12. Apparatus as defined in claim 11, wherein the pressure relief means comprise an internal pressure relief valve in the seal door means.

13. In a vehicle fuel system having a fuel tank and a filler pipe with an inlet selectively closed by a cap having an internal pressure relief valve, an improved seal door assembly in the filler pipe between the inlet and the fuel tank, comprising:

vaportight seal door means in the filler pipe near the inlet defining upper and lower filler pipe ends, the seal door means movable between an open position permitting insertion of a dispenser nozzle therethrough, and a closed position sealing the fuel tank from the upper end of the filler pipe, the seal door means including pressure relief means to vent fuel vapor from the fuel tank to the upper end of the filler pipe at a predetermined differential pressure, the seal door means further comprising a hollow body having an upper portion with a dispenser nozzle contact surface, a lower portion having an axial vent opening in vapor communication with the fuel tank, radial vent ports formed in the upper portion communicating the interior of the hollow seal door body to the upper end of the filler pipe, an internal valve seat between the axial vent opening and the radial vent ports, and an internal valve axially movable on and off the valve seat, the internal valve normally biased to a closed position on the valve seat.

14. In a vehicle fuel system having a fuel tank and filler pipe with an inlet, an improved seal door assembly in the filler pipe between the inlet and the fuel tank, comprising:

partition means in the filler pipe near the filler pipe inlet, the partition means including an aperture sized to permit insertion of a fuel dispenser nozzle through the partition means, the partition means further defining a seal door seat associated with the aperture;

a seal door movable from a closed position on the seat to an open position off the seat upon insertion of a dispenser nozzle through the aperture, the seal door biased by spring means to the closed position;

external seal means associated with the seal door in the seat, the external seal means forming a vapor tight seal between the seal door and the seat in the seal door closed position; and the seal door comprising a hollow body portion having a vapor inlet, a vapor inlet, an internal valve seat between the vapor inlet and outlet, and internal pressure relief valve means movable on and off the valve seat within the hollow body portion to selectively vent fuel vapor through the hollow body portion from the fuel tank to the filler pipe inlet at a predetermined differential pressure.

15. Apparatus as defined in claim 14, wherein the seal door seat in the partition means has a diameter greater than that of the fuel dispenser nozzle aperture, and the hollow body portion of the seal door has a diameter less than that of the seal door seat, and the hollow body portion further includes a radial flange engaging the seal door seat in sealing fashion when the seal door is in the closed position.

16. Apparatus as defined in claim 15, wherein the hollow body portion includes a nozzle contact surface having a diameter greater than that of the fuel dispenser nozzle aperture.

* * * * *

UNITED STATES PATENT AND TRADEMARK OFFICE
CERTIFICATE OF CORRECTION

PATENT NO. : 5,431,199
DATED : July 11, 1995
INVENTOR(S) : Robert P. Benjey, et al.

It is certified that error appears in the above-indentified patent and that said Letters Patent is hereby corrected as shown below:

On the title page, under item [19] and [76], "Benjay" should be --Benjey--.

Column 5, line 41, delete "vapor 10" and insert --vapor pressure--.

Column 7, line 61, delete "a axial" and insert --an axial--.

Column 8, line 10, delete "to a" and insert --at a--.

Signed and Sealed this

Eleventh Day of June, 1996

Attest:

BRUCE LEHMAN

*Attesting Officer*  *Commissioner of Patents and Trademarks*